United States Patent
Eberle

[11] Patent Number: 5,992,150
[45] Date of Patent: Nov. 30, 1999

[54] TRANSAXLE WITH HYDROSTATIC TRANSMISSION

[75] Inventor: Frederick P. Eberle, Simpsonville, S.C.

[73] Assignee: Tecumseh Products Company, Tecumseh, Mich.

[21] Appl. No.: 08/992,772

[22] Filed: Dec. 17, 1997

Related U.S. Application Data

[60] Provisional application No. 60/037,442, Dec. 23, 1996.

[51] Int. Cl.$^6$ ................................................ F16D 33/02
[52] U.S. Cl. ........................ 60/487; 475/83; 74/606 R
[58] Field of Search .................... 475/83, 78; 74/606 R; 60/487

[56] References Cited

U.S. PATENT DOCUMENTS

| | | | |
|---|---|---|---|
| 2,155,198 | 4/1939 | Lawrence | 475/83 |
| 3,227,095 | 1/1966 | Thompson | 103/162 |
| 4,306,467 | 12/1981 | Pollman | 74/687 |
| 4,627,237 | 12/1986 | Hutson . | |
| 4,635,535 | 1/1987 | Thoma et al. . | |
| 4,726,256 | 2/1988 | von Kaler et al. . | |
| 4,781,259 | 11/1988 | Yamaoka et al. . | |
| 4,843,818 | 7/1989 | Thoma et al. | 60/489 X |
| 4,856,368 | 8/1989 | Fujisaki et al. . | |
| 4,870,820 | 10/1989 | Nemoto . | |
| 4,914,907 | 4/1990 | Okada . | |
| 4,920,859 | 5/1990 | Smart et al. | 91/497 |
| 4,932,209 | 6/1990 | Okada et al. . | |
| 4,942,780 | 7/1990 | Fujisaki et al. . | |
| 4,982,566 | 1/1991 | von Kaler et al. . | |
| 5,042,252 | 8/1991 | Havens et al. . | |
| 5,067,933 | 11/1991 | Hardesty et al. | 475/83 X |
| 5,078,659 | 1/1992 | von Kaler et al. . | |
| 5,096,394 | 3/1992 | Gerlach et al. . | |
| 5,177,967 | 1/1993 | von Kaler et al. . | |
| 5,182,966 | 2/1993 | von Kaler et al. . | |
| 5,239,827 | 8/1993 | Havens . | |
| 5,279,185 | 1/1994 | Arnold et al. | 74/606 R |
| 5,392,603 | 2/1995 | Havens et al. . | |
| 5,400,594 | 3/1995 | Hayens . | |
| 5,447,028 | 9/1995 | Azuma et al. . | |
| 5,473,964 | 12/1995 | Okada et al. . | |
| 5,505,279 | 4/1996 | Louis et al. . | |
| 5,513,717 | 5/1996 | Louis et al. . | |
| 5,542,494 | 8/1996 | Louis et al. . | |
| 5,592,818 | 1/1997 | Haag et al. | 60/487 |

*Primary Examiner*—Dirk Wright
*Assistant Examiner*—Peter T. Kwon
*Attorney, Agent, or Firm*—Baker & Daniels

[57] ABSTRACT

Hydrostatic transmission comprises a radial piston pump assembly having an axis of rotation and a gear motor. A hydrostatic fluid pathway extends between the gear motor and the radial piston pump such that the gear motor is fluidly coupled to the radial piston pump, wherein the gear motor comprises at least one gear which is capable of being rotatably driven by a fluid being transported along the fluid pathway. Preferably, a piston guide retains the piston heads against the corresponding slippers without requiring any kind of direct mechanical linkage to maintain such coupling. The present invention further provides a hydraulic shock absorber which absorbs pressure pulses generated by a rotating rotary cylinder block of a radial piston assembly, which may be either a pump or a motor.

16 Claims, 8 Drawing Sheets

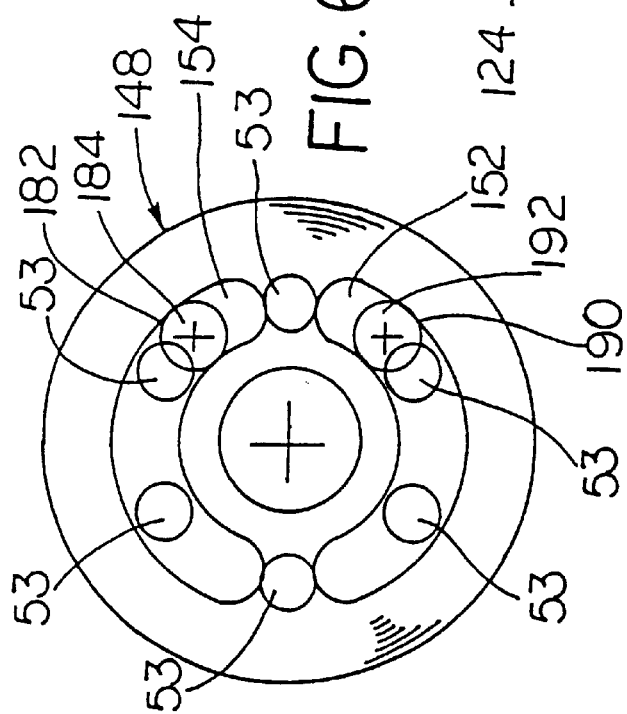
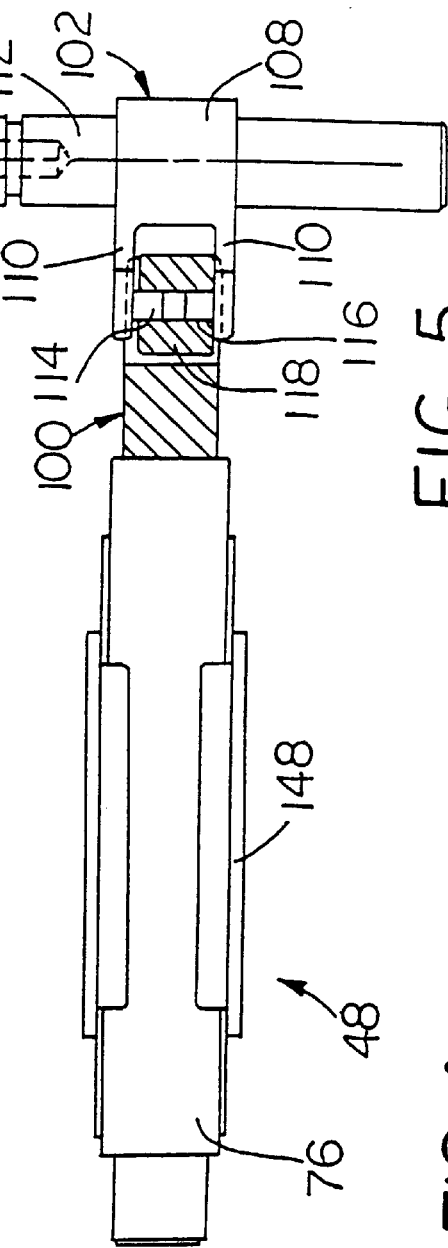
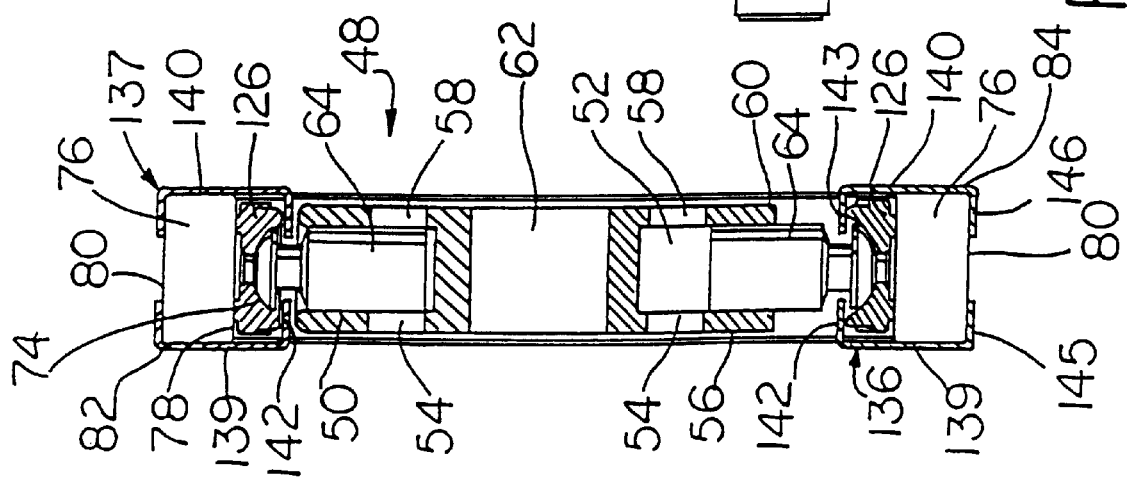

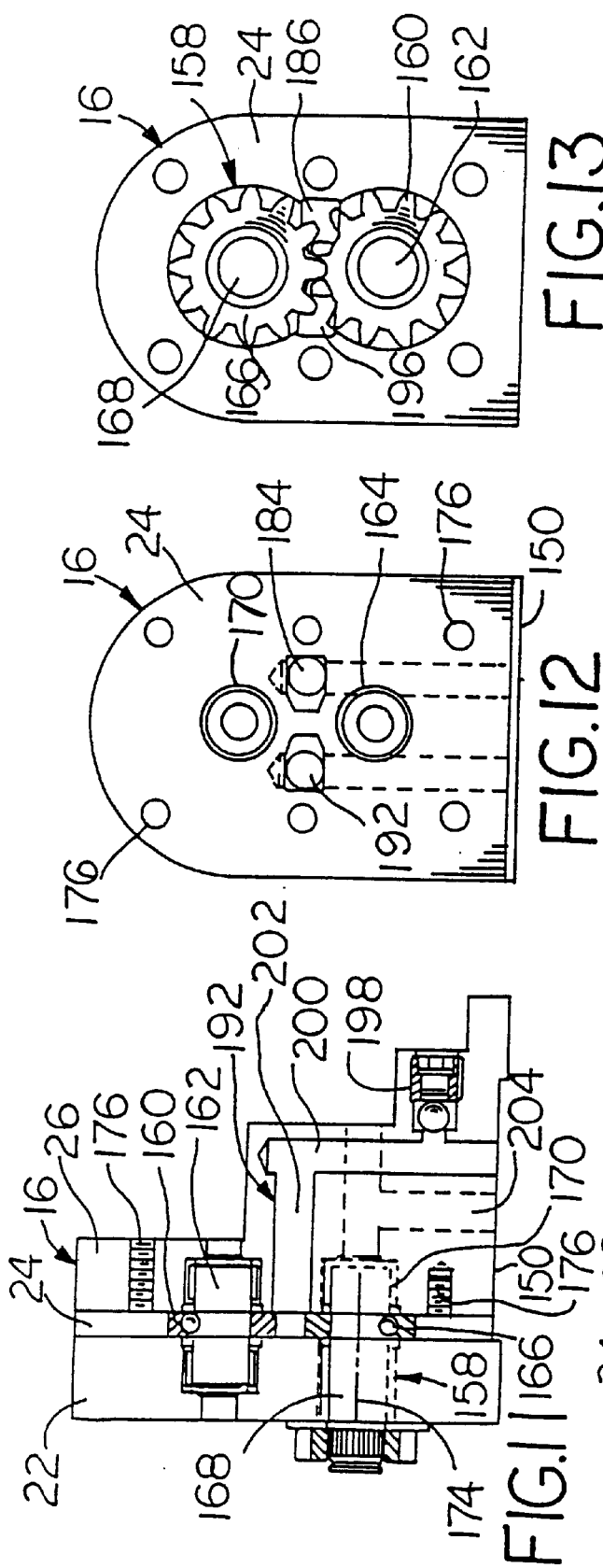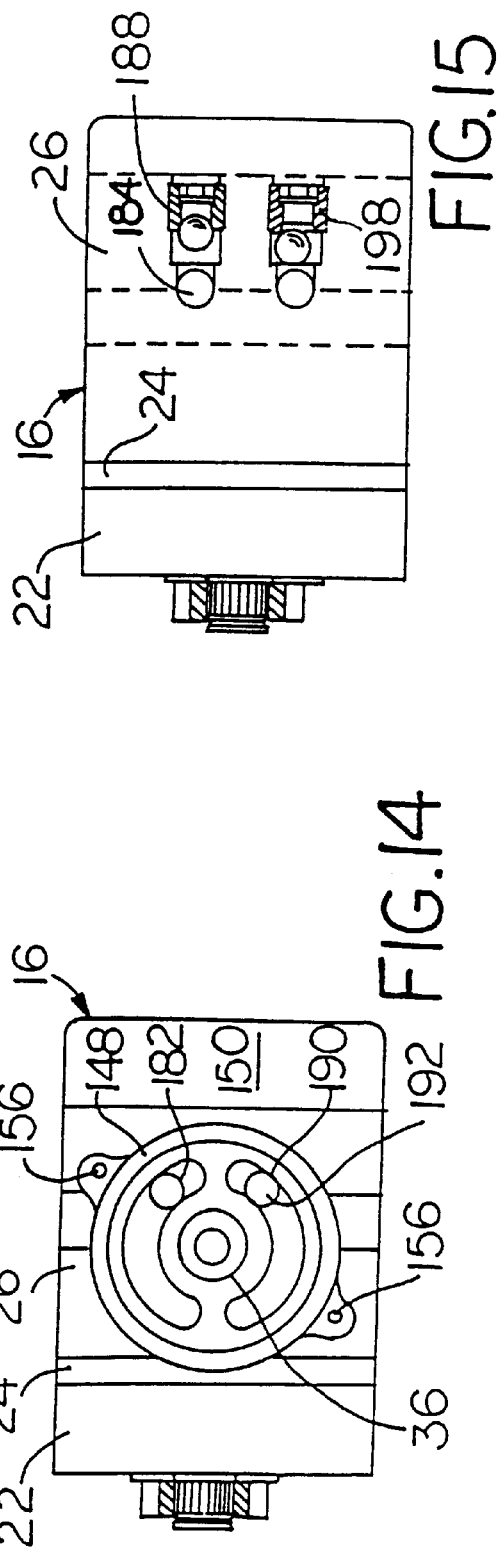

TRANSAXLE WITH HYDROSTATIC TRANSMISSION

This application claims benefit of Provisional application Ser. No. 60/037,442 filed Dec. 23, 1996.

FIELD OF THE INVENTION

The present invention relates to transaxles of the type having an input shaft for receiving rotary power from an energy source, e.g., an internal combustion engine, and an output shaft for transferring rotary mechanical motion to objects, e.g., wheels, to be rotatably driven. More particularly, the present invention relates to variable speed transaxles including a hydromechanical transmission for operationally coupling the input shaft to the output shaft.

BACKGROUND OF THE INVENTION

Small vehicles, such as lawn mowers, lawn and garden tractors, snow throwers, and the like, include an energy source, such as an internal combustion engine, which is used to provide power for rotatably driving an axle which is coupled to wheels which are to be rotatably driven. Most typically, the energy source operates at a single, rotary mechanical speed. Yet, for practical reasons, the axle needs to be able to be rotatably driven at a variety of forward, reverse, and/or neutral speeds. Accordingly, such vehicles may incorporate a transaxle which is used to convert the single speed, rotary mechanical motion of the energy source into a variety of output speeds.

Generally, a transaxle comprises a transaxle input shaft which is operationally coupled to the energy source, a transaxle output shaft, e.g., an axle, which is operationally coupled to the items, e.g., wheels, which are to be rotatably driven, and transaxle componentry which operationally couples the transaxle input shaft to the transaxle output shaft. It is the transaxle componentry which converts the single speed, rotary mechanical motion received from the energy source into a variety of output speeds for rotatably driving the output shaft.

Variable speed transaxles have been developed which control output speed through a single lever. In a typical mode of operation, the lever is moved forward to move the vehicle in the forward direction or pulled backward to move the vehicle in the reverse direction. The farther forward or backward the lever is displaced, the faster the vehicle travels in the corresponding direction.

One form of variable speed transaxle now in use includes a hydrostatic transmission of the type including a hydrostatic pump fluidly coupled to a hydrostatic motor. The hydrostatic pump converts rotary mechanical motion of an input shaft into controllably variable fluid motion. The motor converts such fluid motion back into variable rotary mechanical motion. The rotary mechanical output of the motor is then transferred to the axle by componentry such as a mechanical gear train. The rotational speed outputted by the motor and transmitted to the axle depends, in substantial part, upon the flow rate of the fluid being pumped.

Radial piston pumps and radial piston motors have both been widely used in hydrostatic transmissions of previously known transaxles. A radial piston pump and motor each generally include a rotary cylinder block including radially disposed cylinder bores. The bores house pistons which are capable of reciprocating motion within the bores. The rotary cylinder block is rotatably mounted inside a track ring. The heads of the pistons are coupled to the track ring by slippers which travel around the inside of the track ring as the rotary cylinder block rotates. The track ring is disposed eccentrically around the rotary cylinder block so that the pistons are pulled out of the bores on one side of the rotation cycle (i.e., the suction part of the cycle) and are driven into the bores on the other side of the rotation cycle (i.e., the discharge part of the cycle).

In operation, the rotary cylinder block of the pump is rotatably driven by an input shaft, thus causing the pump pistons to reciprocate in the pump cylinder bores. Such reciprocation creates a pumping action for transporting hydrostatic fluid to and from the motor which is fluidly coupled to the pump. The transport of the fluid creates a pressurized fluid flow that drives the motor pistons. This, in turn, causes the motor rotary cylinder block to rotate within the motor track ring. Rotation of the motor rotary cylinder block rotatably drives a motor output shaft. The track ring of the pump is pivotable, which allows the operator to vary the eccentricity of the track ring relative to the pump rotary cylinder block. Generally, increased eccentricity increases the length of the pump piston stroke, and a longer piston stroke corresponds to higher output speeds. Thus, by pivoting the track ring, the operator controls output speed. The pump track ring can also be pivoted in two directions away from a neutral setting. One direction corresponds to a forward mode of operation, and the other corresponds to a reverse mode of operation. Whereas the pump track ring is pivotable, allowing the operator to control output speed and direction, the motor track ring is most typically eccentrically fixed relative to the motor rotor cylinder block. U.S. Pat. No. 5,182,966 (von Kaler), as one example, describes a particularly effective and reliable hydrostatic transmission for a transaxle in which the transmission includes a radial piston pump fluidly coupled to a radial piston motor.

A radial piston pump is one of the most efficient and effective ways for converting rotary mechanical motion into fluid motion. However, a radial piston motor is somewhat less efficient at converting fluid motion back into rotary mechanical motion. Accordingly, it would be desirable to improve the efficiency of the motor component of a hydrostatic transmission of the type including a radial piston pump so that the overall efficiency of the transmission could be improved.

In previously known radial piston pump and motor assemblies, the piston heads are typically coupled to the slippers by a direct mechanical linkage such as rivets, pins, and the like. Although reliable as far as the operator is concerned, such linkage tends to increase the complexity, parts count, expense, and/or time required for transmission assembly. It would be desirable, therefore, to simplify the manner in which the piston heads are coupled to the slippers.

Radial piston pump and motor assemblies tend to be subject to vibration forces which arise due to the substantial pressure differences between the suction and discharge sides of the rotary cylinder block. For example, the discharge side of a rotary cylinder block of a radial piston pump may be typically characterized by a discharge pressure on the order of 1500 psi, whereas the suction side of the rotary cylinder block may be characterized by a suction pressure on the order of −5 psi. When the rotary cylinder block rotates at ordinary rotational speeds, e.g., 1500 to 4000 rpm, such pressure differences tends to set up vibrations that are not only noisy, but may also be severe enough such that the vibrations could even damage the transmission if not controlled properly. Previously, transaxles have employed mechanical means, e.g., clamps, to help hold a radial piston assembly in proper position and thereby attempt to overcome vibrations by physical clamping force. Such techniques, however, do not eliminate the magnitude of the vibration forces, thus requiring the mechanical means to absorb and control the full magnitude of such forces. Accordingly, there is a need to provide such transmissions with a way to reduce the magnitude of the vibration forces in order to reduce, and even eliminate, the demands placed upon the mechanical means used to absorb and control such forces.

SUMMARY OF THE INVENTION

In one aspect, the present invention provides a transaxle having a hydrostatic transmission of the type including a radial piston pump and a motor coupled to the pump, wherein the transmission is characterized by greatly improved overall efficiency. Rather than fluidly couple a radial piston pump to a radial piston motor as has been done previously, the transmission of the present invention fluidly couples a radial piston pump to a gear motor. This aspect of the present invention is based upon the appreciation that a gear motor is one of the most effective and efficient ways to convert fluid motion into rotary mechanical motion. As a result, the present invention combines a highly effective and efficient radial piston pump with a highly effective and efficient gear motor. As another advantage, because the gear motor is so much more efficient than a radial piston motor, the transmission of the present invention is much more compact than previously known transmissions comprising both a radial piston pump and a radial piston motor. Further, because a gear motor includes a substantially fewer number of parts as compared to a radial piston motor, the transmission of the present invention is easier, less complex, and more economical to assemble.

According to this aspect of the present invention, a hydrostatic transmission comprises a radial piston pump assembly having an axis of rotation and a gear motor. A hydrostatic fluid pathway extends between the gear motor and the radial piston pump such that the gear motor is fluidly coupled to the radial piston pump, wherein the gear motor comprises at least one gear which is capable of being rotatably driven by a fluid being transported along the fluid pathway. Preferably, the hydrostatic fluid pathway is sufficiently nonlinear such that a fluid transported along said pathway is capable of rotatably driving said at least one gear on an axis of rotation which is substantially nonparallel to the axis of rotation of the radial piston pump assembly. This aspect of the present invention also relates to a transaxle incorporating such a hydrostatic transmission.

In another aspect, the present invention relates to a radial piston assembly, which can be either a motor or a pump as desired, in which the coupling between the pistons and the slippers is greatly simplified. Rather than use a direct mechanical linkage to accomplish such a coupling, this aspect of the present invention uses a piston guide which, in effect, retains or biases the piston heads against the corresponding slippers without requiring any kind of direct mechanical linkage to maintain such coupling. In preferred embodiments, a single piston guide including just two annular shaped rings can be used to retain all pistons against the corresponding slippers. This greatly reduces the number of parts required for assembly, thus making it easier, less complex, and more economical to manufacture such an assembly.

According to this aspect of the present invention, a radial piston assembly comprises a rotary cylinder block having an axis of rotation and comprising a plurality of radially disposed cylinder bores. A plurality of pistons are disposed in said cylinder bores, each of said pistons capable of reciprocating movement in a corresponding cylinder bore, and each of said pistons having a base end and a head, wherein the head is oriented in a direction radially outward from the rotary cylinder block. A track ring surrounds and is spaced eccentrically apart from the rotary cylinder block. The track ring comprises a first axial face, a second axial face, an inner face disposed towards the rotary cylinder block, and an outer face disposed away from the rotary cylinder block. A plurality of slippers are coupled to the inner face of the track ring for travel along a circumferential path corresponding to the inner face of the track ring. Each slipper comprises a surface disposed radially toward the rotary cylinder block, wherein said surface is adapted to receive the head of a corresponding piston. A piston guide for retaining the heads of the pistons against the surfaces of the corresponding slipper shoes is provided in a manner such that there is no direct mechanical linkage between the piston heads and the corresponding surfaces of the slipper shoes. Rotation of the rotary cylinder block about said axis causes each piston to radially reciprocate in the corresponding cylinder bore.

In still another aspect, the present invention provides a hydraulic shock absorber which absorbs pressure pulses generated by a rotating rotary cylinder block of a radial piston assembly, which may be either a pump or a motor. According to this aspect, the present invention provides a hydrostatically dampened transmission assembly comprising a radial piston pump comprising a rotary cylinder block having first and second axial faces and a plurality of radially disposed cylinder bores. The cylinder bores include first and second fluid ports, wherein the first ports of the cylinder bores are in fluid communication with the first axial face of the rotary cylinder block and the second ports of the cylinder bores are in fluid communication with the second axial face of the rotary cylinder block. The first ports are capable of being fluidly coupled to a fluidly driveable motor. A hydrostatic shock absorber comprising at least one hydraulically displaceable surface is disposed in fluid communication with the second fluid ports of the cylinder bores.

In still another aspect, the present invention provides a hydrostatically dampened transmission assembly comprising a radial piston pump including a rotary cylinder block comprising a plurality of radially disposed cylinder bores. The rotary cylinder block is capable of rotation about an axis and is provided with first and second axial faces. A plurality of said cylinder bores include first and second fluid ports. Each of the first fluid ports of said plurality of cylinder bores is in fluid communication with the first axial face of the rotary cylinder block, and each of the second fluid ports of said plurality of cylinder bores is in fluid communication with the second axial face of the rotary cylinder block. A first valve plate is disposed against the first axial face of the rotary cylinder block, wherein said valve plate comprises intake and discharge ports. The first fluid ports of said plurality of cylinder bores successively communicate with the suction and discharge ports of the valve plate during rotation of the rotary cylinder block. A second valve plate is disposed against the second axial face of the rotary cylinder block, wherein said second valve plate comprises at least one port. The second fluid ports of said plurality of cylinder bores successively communicate with said at least one port during rotation of the rotary cylinder block. A motor is provided for operationally engaging an output shaft. A hydrostatic fluid pathway extends between the radial piston pump and the motor for fluidly coupling the radial piston pump to the motor such that the motor converts fluid motion generated by the pump into rotary mechanical motion. A hydrostatic shock absorber is in fluid communication with said at least one port of the second valve plate. The shock absorber is adapted to absorb fluid pressure pulses transmitted through the second fluid ports of the cylinder bores and the port of the second valve plate by the radial piston pump as the rotary cylinder block of the radial piston pump rotates.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a sectional view of the radial piston pump assembly of FIG. 3;

FIG. 5 is a side view of the radial piston pump assembly of FIG. 3 with some parts shown in section;

FIG. 6 is a plan view of a valve plate which is disposed between the radial piston pump assembly and motor housing of the transaxle shown in FIG. 1;

FIG. 11 is a plan sectional view of the gear motor and corresponding motor housing used in the transaxle embodiment of FIG. 1;

FIG. 12 is a side view of the gear motor and housing of FIG. 11;

FIG. 13 is a side sectional view of the gear motor and motor housing of FIG. 11;

FIG. 14 is an end view showing the valve plate of FIG. 6 fastened to the motor housing of FIG. 11;

FIG. 15 is an end view partially in section of the motor housing of FIG. 11 showing check valves used to provide makeup oil to the hydrostatic fluid pathways provided in the motor housing;

Corresponding reference characters indicate corresponding parts throughout the several views. The exemplifications set out herein illustrate preferred embodiments of the invention and such exemplifications are not to be construed as limiting the scope of the invention in any manner.

DETAILED DESCRIPTION OF THE INVENTION

The various aspects of the present invention will now be described with reference to the particular variable speed transaxle embodiments shown in FIGS. 1–20. However, the embodiments disclosed below are not intended to be exhaustive or to limit the invention to the precise forms disclosed in the following detailed description.

Referring to FIGS. 1–17, there is shown one embodiment of a variable speed transaxle, generally designated 10, configured in accordance with the principles of the present invention. Transaxle 10 is particularly well suited for transferring rotary motion from an energy source such as an internal combustion engine (not shown) to the drive wheels of a vehicle (not shown) in which transaxle 10 is installed.

Figure 1:
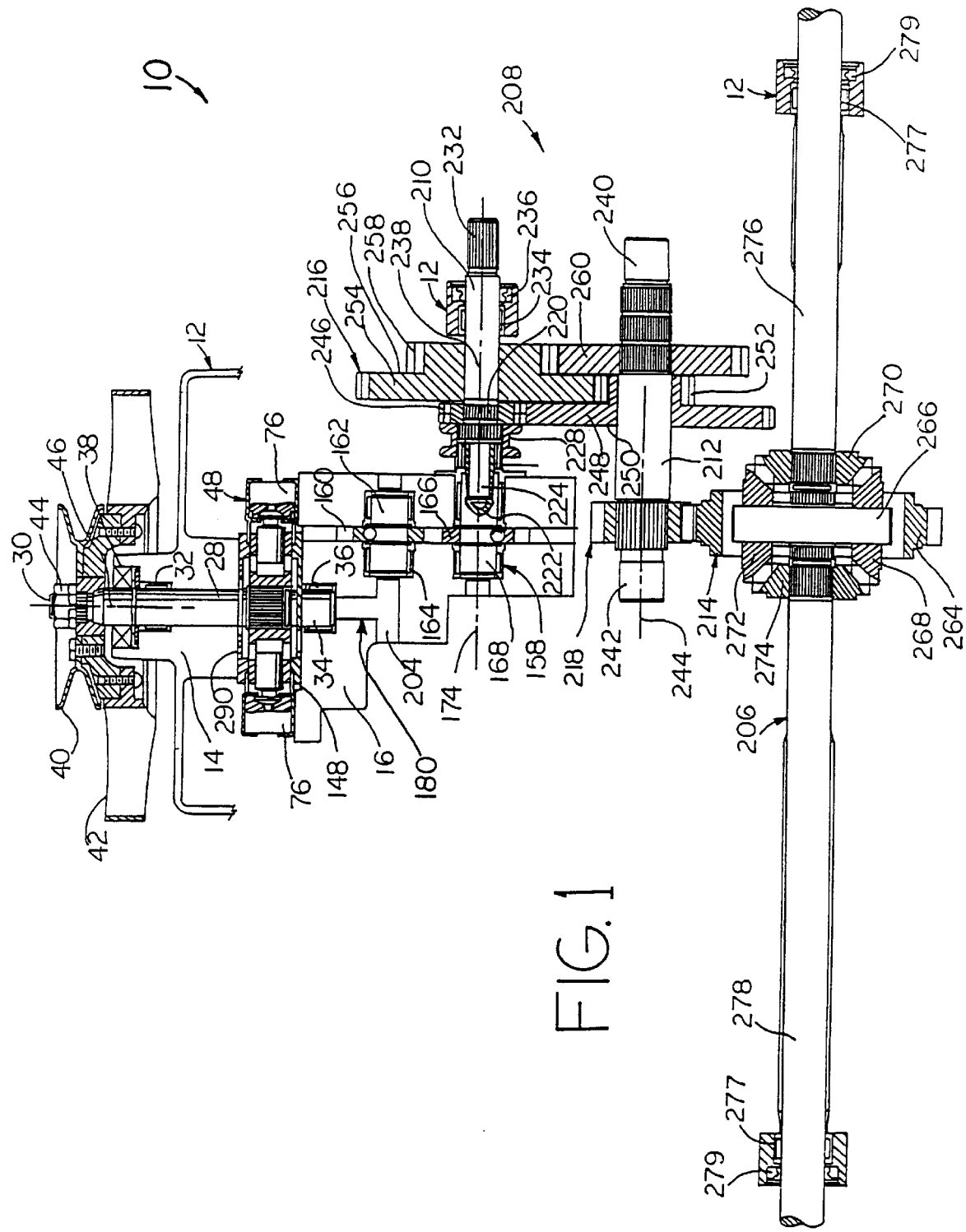
FIG. 1 is a front sectional view of a transaxle embodiment configured in accordance with the principles of the present invention.
Figure 2:
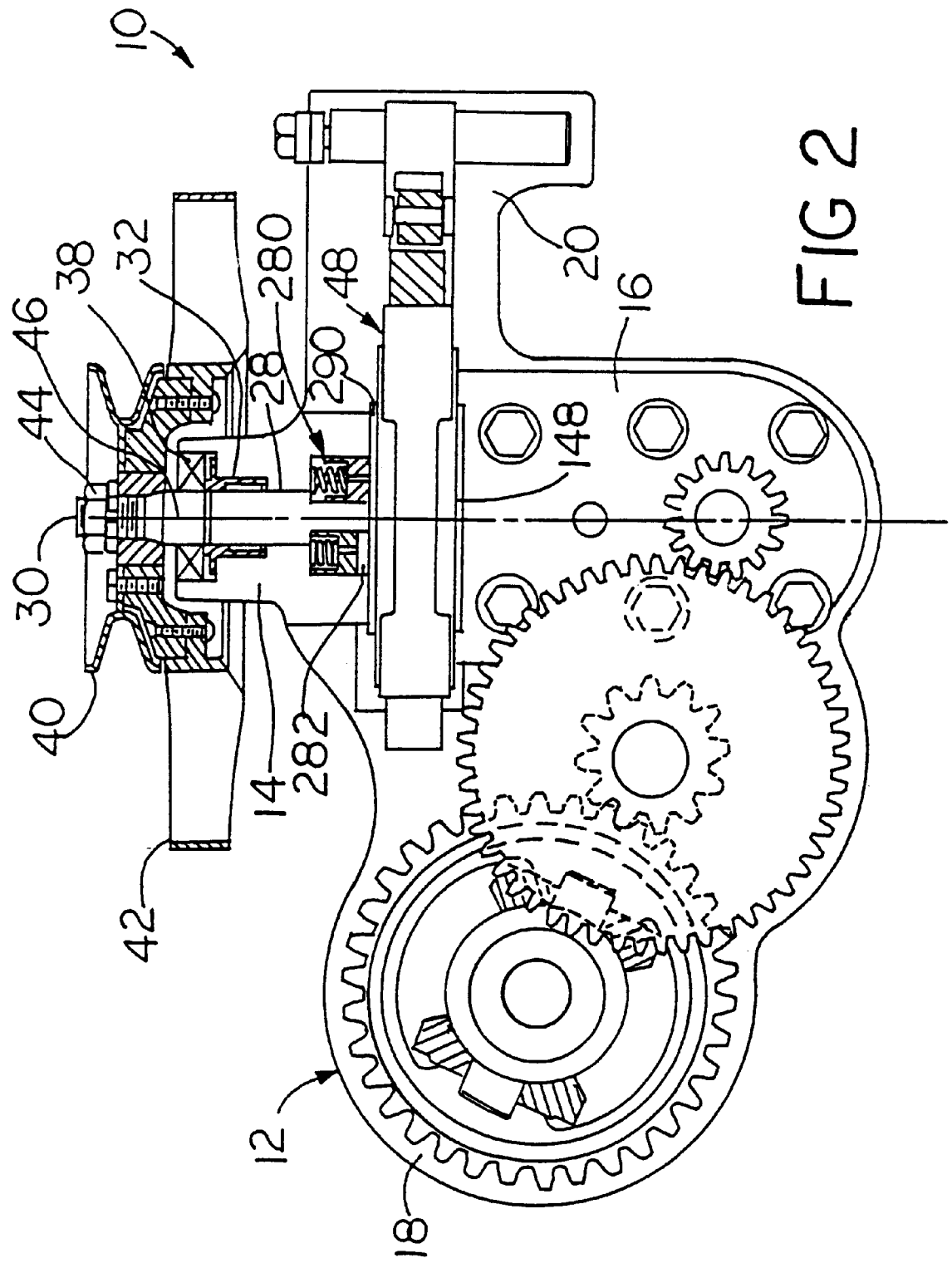
FIG. 2 is a side view of the transaxle of FIG. 1 with some parts shown in section.

With particular reference to FIGS. 1 and 2, the components of transaxle 10 are encased within a single housing 12 filled with oil. Advantageously, the same oil that is used for lubricating the moving components of transaxle 10 is also used for hydrostatic operation. Housing 12 includes input shaft housing portion 14, motor housing portion 16, drive train housing portion 18, and track ring control housing portion 20. Although housing 12 functionally includes these four housing portions, housing 12 need not be manufactured from four different pieces corresponding to these four portions, but rather may be formed from more or less parts which may or may not correspond to these four housing portions, as desired, in accordance with conventional practices in the art. For example, motor housing portion 16 can be fabricated from pieces 22, 24, and 26 in order to facilitate assembly of the motor componentry, whereas input shaft housing portion 14, drive train housing portion 18, and track ring control housing portion 20 may be collectively formed from two pieces which are joined along a planar or nonplanar parting line which may be oriented either horizontally or vertically, as desired. Transaxle 10 includes rotatable input shaft 28 for receiving rotational power from the energy source, which in most typical applications is an internal combustion engine. Input shaft 28 has a top end 30 which is rotatably journalled upon needle bearings 32 provided in input shaft housing portion 14. Input shaft 28 also includes a bottom end 34 which is rotatably journalled upon needle bearings 36 provided in motor housing portion 16. Oil seals 38 provide a fluid tight seal between input shaft 28 and the portion of input shaft housing portion 14 at which input shaft 28 extends from housing 12. Rotational power from the energy source is transmitted to input shaft 28 using a drive belt (not shown) connected to pulley 40 which is secured to the top end 30 of input shaft 28. Top end 30 of input shaft 28 is threaded to receive threaded fasteners 44 for holding pulley 40 and fan assembly 42 on input shaft 28. Pulley 40 and fan assembly 42 cooperate to provide an external cooling system for transaxle 10. Fan assembly 42 and pulley 40 are fixedly mounted to input shaft such that rotational power transmitted to input shaft 28 by pulley 40 causes input shaft 28 to rotate about axis of rotation 46.

Referring now to FIGS. 1–10, radial piston pump assembly 48 is fixedly splined to the lower portion of input shaft 28 so that rotation of input shaft 28 is imparted to radial piston pump assembly 48. Thus rotation of input shaft 28 causes radial piston pump assembly 48 to rotate about axis of rotation 46.

Radial piston pump assembly 48 includes rotary cylinder block 50 which includes a plurality of radially disposed cylinder bores 52. As seen best in FIG. 3, rotary cylinder block 50 includes six cylinder bores 52. However, a rotary cylinder block including more or less cylinder bores also could be used, as desired. In the practice of the present invention, cylinder bores 52 are advantageously provided with dual ports. One set of the ports allows radial piston pump assembly 48 to be hydrostatically coupled to a motor as will be described in more detail below. The other set of ports advantageously allows radial piston pump assembly 48 to be advantageously coupled to a hydrostatic damping means which is used to significantly reduce the vibration and noise which has characterized some radial piston pump assemblies of the prior art. Thus, as seen best in FIG. 4, cylinder bores 52 are provided with first ports 54 which are in fluid communication with first axial face 56 of rotary cylinder block 50. Cylinder bores 52 are also provided with second ports 58 which are in fluid communication with second axial face 60 of rotary cylinder block 50. FIG. 4 also illustrates how rotary cylinder block 50 includes splined central aperture 62 for receiving input shaft 28.

As seen best in FIGS. 3, 4, 7, and 10, a plurality of pistons 64 are disposed in cylinder bores 52. Each of pistons 64 is capable of reciprocating movement in a corresponding bore 52. Pistons 64 each include a base end 66 interconnected to head 68 by neck 70. Neck 70 has a reduced diameter relative to head 68 such that head 68 is provided with an underside surface 72. Piston heads 68 also include a top convex surface 74. As will be described below, the convex characteristics of top surfaces 74 advantageously facilitates the unique manner in which pistons 64 of the present invention are coupled to corresponding slipper 86 in particularly preferred embodiments of the invention.

Referring now primarily to FIGS. 1–5, radial piston pump assembly 48 includes eccentrically pivotable track ring 40 surrounding and spaced apart from rotary cylinder block 50. Track ring 76 includes an inner face 78 disposed towards the rotary cylinder block 50, outer face 80 disposed away from rotary cylinder block 50, a first axial face 82 and a second axial face 84. Track ring 76 is eccentrically pivotable relative to rotary cylinder block 50 by means of structure including pivoting extension member 88 which extends from one side of track ring 76 to be received by a correspondingly shaped aperture 90 provided in housing portion 92. The outer surface of pivoting extension member 88 is convexly shaped and aperture 90 is concavely shaped such that pivoting extension member 88 and aperture 90, in effect, form a ball and socket joint to thereby provide an axis 94 about which track ring 76 is pivotable.

The pivotable connection between track ring 76 and housing portion 92 allows track ring 76 to eccentrically pivot and thereby vary the piston stroke of pistons 64. Variation of the piston stroke, in turn, changes the volumetric displacement of the radial piston pump assembly 48. Generally, a greater piston stroke, which corresponds to greater volumetric displacement, provides a higher output speed. Thus, track ring 76 can be pivoted in one direction to provide variable output speeds in a forward direction and can be pivoted in the other direction to provide variable speeds in the reverse direction. Track ring 76 can also be pivoted into a position in which track ring 76 is substantially concentric about rotary cylinder block 50. When track ring 76 and rotary cylinder block 50 are substantially concentric, there is substantially no piston stroke as rotary cylinder block 50 rotates. In such a setting, transaxle 10 is in neutral. Pivoting track ring 76 in the direction indicated by arrows 96 and 98 corresponds to variable output speeds in the forward and reverse directions.

In order to allow an operator to pivot track ring 76 and thereby control the output speed and direction, is provided with a bifurcated extension 100 which includes stem 104 and arms 106 which engage control mechanism 102. In the embodiment shown in the figures, stem 104 is press fit into track ring 76. Stem 104, for example, can be joined to track ring 76 in any convenient manner and could even be formed integrally as desired.

Control mechanism 102 includes a U-shaped body 108 having arms 110 at one end and a control rod 112 at the other end. Arms 110 of control mechanism 102 are oriented transversely to arms 106 of bifurcated extension 100. Pin 114 extends between arms 110 and is rotatably received in aperture 116 of lug element 118. Top end 120 of control rod 112 extends outside housing 12 as seen best in FIG. 2. Top end 120 of control rod 112 includes an aperture 122 for receiving a lever (not shown) by which the operator can rotate control rod 112 about axis 124 and thereby cause track ring 76 to pivot about axis 94.

Referring now primarily to FIGS. 1–4 and 7–10, each piston 64 is provided with a corresponding slipper 126. Slippers 126 are coupled to the inner face 78 of track ring 76 for travel around a circumferential path corresponding to the inner face 78 of track ring 76. In the embodiment shown in the Figures, slippers 126 are coupled directly to inner face 78, but could be coupled to inner face 78 indirectly by intervening coupling parts, if desired. Use of an indirect coupling is less desirable, however, because indirect coupling would involve more parts which would tend to increase the complexity, expense, and/or time for assembly of transaxle 10. Each slipper 126 includes an inner surface 128 disposed toward rotary cylinder block 50. The inner surface 128 of each slipper 126 is configured to receive the head 68 of the corresponding piston 64. In particularly preferred embodiments of the present invention in which each piston head 68 includes a top convex surface 74 as depicted in the drawings, inner surface 128 of slippers 126 includes a surface portion 130 which is concave to receive the corresponding convex head 68 of the corresponding piston 64. Each slipper 126 is also provided with a through aperture 132 which facilitates lubrication of the interface between concave surface portion 130 and the corresponding convex piston head 68.

In preferred embodiments of the present invention, pistons 64 are not directly connected to slippers 126 by conventional mechanical means such as rivets, pins, or the like. Instead, in the practice of the present invention, convex heads 68 of pistons 64 are retained against slippers 126 by novel piston guide generally designated as 134. Thus, in preferred embodiments of the invention, there is no direct mechanical linkage between piston heads 68 and slippers 126.

Figure 3:
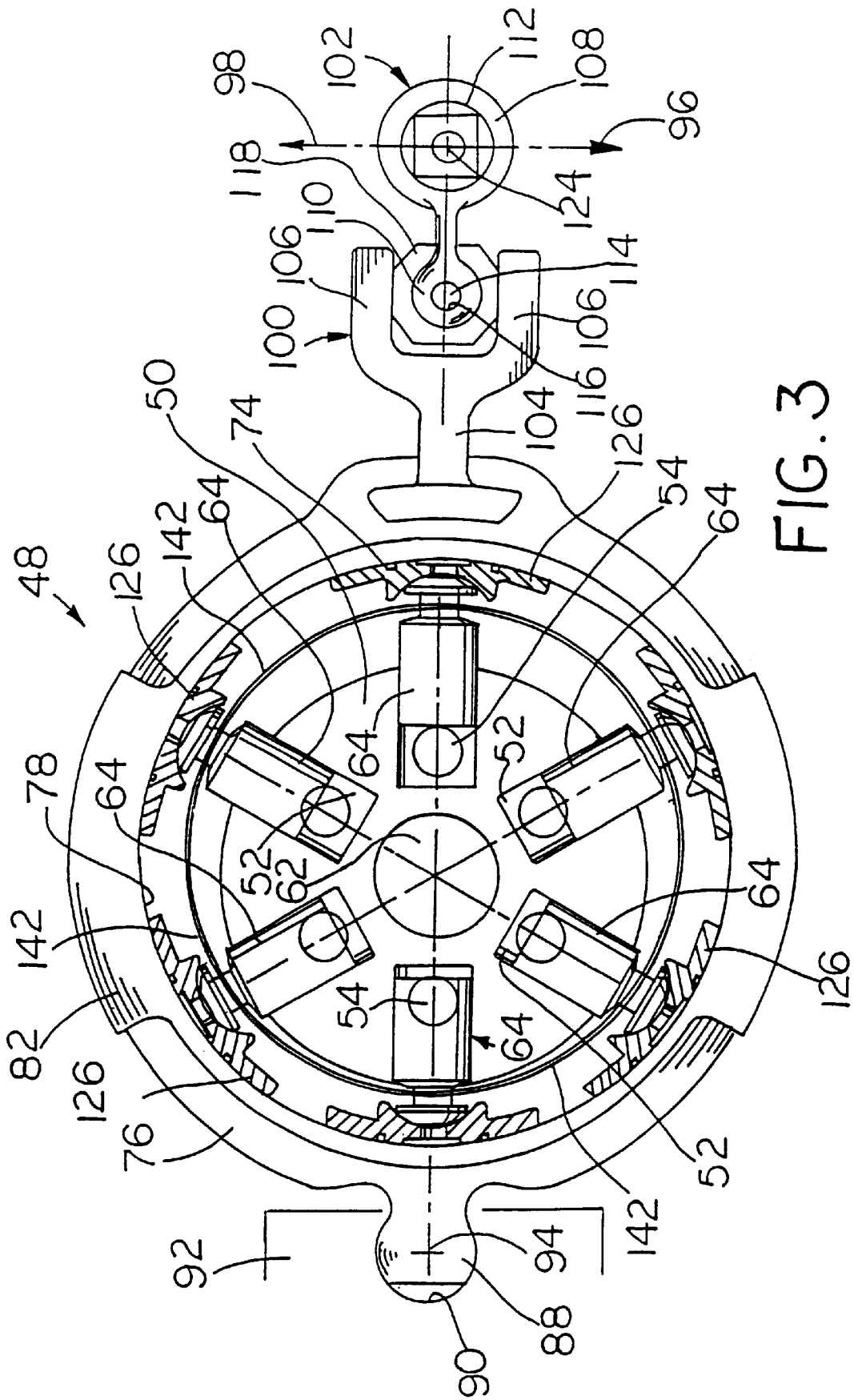
FIG. 3 is a plan view of the radial piston pump assembly used in the transaxle embodiment of FIG. 1.
Figure 7:
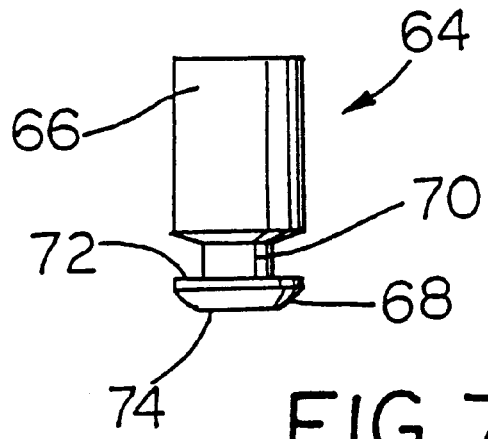
FIG. 7 is a side view of a piston used in the radial piston pump assembly of FIG. 3.
Figure 8:
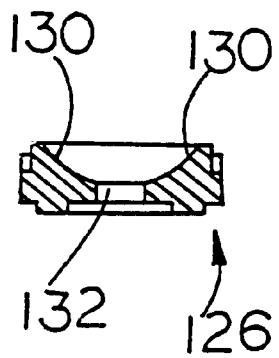
FIG. 8 is a sectional view of a slipper used in the radial piston pump assembly of FIG. 3.
Figure 9:
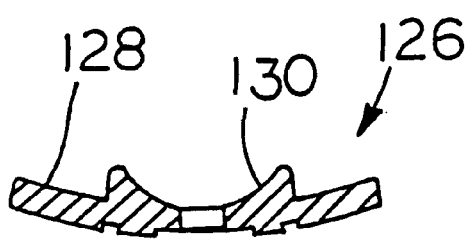
FIG. 9 is a side sectional view of the slipper used in the radial piston pump assembly of FIG. 3.
Figure 10:
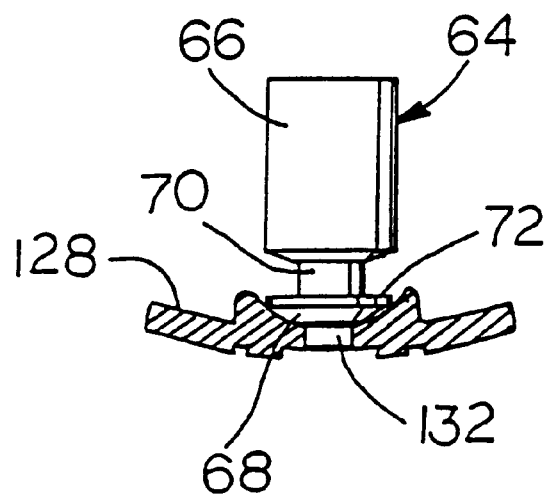
FIG. 10 is a side view showing a piston of FIG. 7 seated against the slipper of FIGS. 8 and 9, wherein the slipper is shown in cross section.

As shown best in FIGS. 3 and 4, preferred embodiments of the piston guide of the present invention include a first annular shaped ring 136 and a second annular shaped ring 137. First annular shaped ring 136 includes base 139. A portion of base 139 engages first axial face 56 of rotary cylinder block 50 and the second portion of base 139 extends radially inward from track ring 76 in a direction substantially toward rotary cylinder block 50. A flange 142 extends axially inward from base 139 such that flange 142 is spaced apart from track 76 and such that flange 142 engages the underside surfaces 72 of piston heads 68 to retain pistons 64 loosely against or in close proximity to slippers 126. Centrifugal force presses the pistons radially outwardly into engagement with the slippers. Annular shaped ring 136 further includes a second flange 145 which extends axially inward from base 139 such that the second flange 145 is disposed proximal to the outer face 80 of track ring 76. The second annular shaped ring 137 includes a corresponding base 140 and flanges 143 and 146. Annular shaped rings 136 and 137 can be adapted for a snap-fit or press-fit engagement with track ring 76, or could be attached to track ring 76 by other suitable fastening techniques such as screws, rivets, welds, combinations thereof, or the like, as desired.

The combination of convex piston heads 68 and concave slipper surfaces 130 is uniquely well adapted to work in cooperation with piston guide 134 Advantageously, when rotary cylinder block 50 rotates, centrifugal force acting upon convex piston heads 68 tends to keep piston heads 68 centered and in proper position against the concave surface portions 130 of slippers 126 even without any direct mechanical connection linking piston heads 68 to slippers 126. In contrast, if piston heads 68 were to be concave and slippers 126 were to be convex, centrifugal forces acting upon piston heads 68 would tend to throw piston heads 68 off of slippers 126 during rotation in the absence of mechanical linkage between piston heads 68 and slippers 126. As an additional advantage, the convex/concave configuration of piston heads 68 and slippers 126 acts as a ball and socket joint allowing heads 68 and slippers 126 to pivot relative to each other during rotation of rotary cylinder block 50.

Referring now to FIGS. 1, 2, 5, 6, and 14, valve plate 148 is disposed between motor housing portion 16 and first axial face 56 of rotary cylinder block 50. In the particular setting of track ring 76 in which track ring 76 has been pivoted in the direction of arrow 96 (i.e., transaxle 10 is in a forward mode of operation), valve plate 148 includes arcuate shaped suction port 152 and arcuate shaped discharge port 154. Of course, when transaxle 10 is reversed by pivoting track ring 76 in the direction of arrow 98, suction port 152 becomes the discharge port and discharge port 154 would become the suction port. First ports 54 of rotary cylinder block 50 successively communicate with suction and discharge port 152 and 154 during rotation of rotary cylinder block 50. Thus, during rotation of rotary cylinder block 50, hydrostatic fluid is discharged through first ports 54 and through discharge port 154 of valve plate 148, and hydrostatic fluid is drawn into first ports 54 of rotary cylinder block 50 through suction port 152 of valve plate 148. As seen best in FIG. 14, valve plate 148 is secured to motor housing portion 16 by fasteners 156.

Referring now to FIGS. 1, 2, and 11–15, motor housing portion 16 houses gear motor 158 which is hydrostatically coupled to radial piston pump assembly 48. Gear motor 158 includes spur gear 160 which is coupled to spur gear shaft 162. Spur gear shaft 162 is rotatably journalled in motor housing portion 16 upon bearings 164. As seen best in FIG. 11, spur gear 160 and spur gear shaft 162 essentially function as an idler mechanism. Optionally, however, spur gear shaft 162 can be extended through motor housing portion 16 to act as an additional power take off. Gear motor 158 also includes spur gear 166 which is fixedly coupled to spur gear shaft 168. Spur gear shaft 168 is rotatably journalled in motor housing portion 16 upon bearings 170. Spur gear shaft 168 extends outside motor housing portion 16 through side face 172 for rotational power take off. Thus, spur gear shaft 168 functions as a motor output shaft for power take off from gear motor 158. Spur gear shaft 168 has an axis of rotation 174 which is substantially perpendicular to the axis of rotation 46 of input shaft 28 and rotary cylinder block 50. Advantageously, this perpendicular orientation allows input shaft 28 to be oriented vertically for receiving power from the energy source in the most convenient manner, while spur gear shaft 168 is oriented horizontally for power transfer to objects, such as wheels, which are to be rotatably driven by transaxle 10. As FIGS. 1 and 11 illustrate, either spur gear shaft 162 or 168 of the gear motor can be used as the power output shaft and a variety of drive connections are possible.

Advantageously, gear motor 158 is highly efficient at converting hydrostatic fluid motion into rotary mechanical motion. Thus, in preferred embodiments of the present invention comprising a radial piston pump and a gear motor such as gear motor 158, the resultant transaxle includes a combination of a highly efficient pump with a highly efficient motor, thus providing a pump and motor combination which has overall enhanced efficiency relative to pump and motor combinations which have been previously known.

Referring now to FIGS. 1, 6, and 11–15, transaxle 10 includes a hydrostatic fluid pathway 180 coupling radial piston pump assembly 48 to gear motor 158, which allows gear motor 158 to be rotatably driven as hydrostatic fluid is transported along hydrostatic fluid pathway 180 by pump 48. Hydrostatic fluid pathway 180 includes discharge port 182 providing fluid communication between arcuate shaped discharge port 154 of valve plate 148 and discharge fluid passageway 184. Discharge fluid passageway 184 extends from discharge port 182 to discharge region 186 disposed above intermeshing spur gears 160 and 166. Discharge fluid passageway 184 further includes check valve 188 through which make up hydrostatic fluid is provided to the system in a conventional manner. Similarly, hydrostatic fluid pathway 180 further includes suction port 190 providing fluid communication between arcuate shaped suction port 152 of valve plate 148 and suction fluid passageway 192. Suction fluid passageway 192 extends from suction port 190 to intake region 196 disposed below intermeshing spur gears 160 and 166. Suction fluid passageway 192 also includes check valve 198 for providing make up hydrostatic fluid to the system.

In embodiments of the present invention in which rotary mechanical output motion of transaxle 10 is not intended to be parallel to the axis of rotation of input shaft, it is preferred that the hydrostatic fluid passageways 184 and 192 are sufficiently non-linear such that a hydrostatic fluid transported along such passageways is capable of rotatably driving spur gears 160 and 166 on an axis of rotation which is substantially non-parallel to axis of rotation 46 of rotary cylinder block 50. For example, as shown in the Figures, suction fluid passageway 192 includes a first portion 200, a second portion 202, as well as intake region 196. First portion 200 of fluid passageway 192 extends away from valve plate 148 in a direction substantially parallel to axis of rotation 46 of radial piston pump 48. Second portion 202 of fluid passageway 192 extends away from first portion 200 and is oriented at 90° to first portion 200, and thus accomplishes a 90° turn of the hydrostatic fluid. Intake region 196, in turn, extends 90° away from second portion 202 in a direction which is substantially perpendicular to the plane defined by first portion 200 and second portion 202. Such non-linearity of suction fluid passageway 192 allows hydrostatic fluid to be delivered to intermeshing gears 160 and 166 in a manner such that gears 160 and 166 are rotatably driven on an axis which is substantially perpendicular to that of input shaft 28. Although not depicted in the drawings, discharge fluid passageway 184 includes a corresponding first portion, second portion, and discharge regions to accomplish the same kind of change of direction as the hydrostatic fluid is transported through discharge fluid passageway 184. As also seen in FIGS. 1 and 11, motor housing portion 16 further includes lubrication passages 204 for transporting lubricating fluid to the various moving components of gear motor 158.

Spur gear shaft 168, which functions as a motor output shaft, may be drivingly connected to output shaft 206 by a suitable driving mechanism in accordance with conventional practices. A representative example of a preferred mechanism is shown in FIG. 1. There, a driving mechanism, generally designated as 208, includes a first countershaft 210, a second countershaft 212, differential 214, a first reduction gearing set 216, and a second reduction gearing set 218. First countershaft 210 has first end 220 operatively coupled to spur gear shaft 168 by linkage 222, 224, 226, 228, and 230. Second end 232 of first countershaft 210 extends from housing 12 and is rotatably supported upon needle bearings 234. Oil seal 236 provides a fluid tight seal between first countershaft 210 and housing 12. Second end 232 of first countershaft 210 is splined to facilitate connection to a device such as a braking assembly (not shown) or other items to be rotatably driven by first countershaft 210. First countershaft 210 has an axis of rotation 238 which is substantially perpendicular to axis of rotation 46.

First reduction gearing set 216 is provided to drivingly connect first countershaft 210 to second countershaft 212. First reduction gear set 216 includes pinion gear 260 fixedly splined to first countershaft 210. Pinion gear 246 meshingly engages large diameter portion 248 of transfer gear 250, which is mounted for free wheeling rotation upon second countershaft 212. Small diameter portion 252 of transfer gear 250 meshingly engages large diameter portion 254 of transfer gear 256 which is mounted for free wheeling rotation upon first countershaft 210. Small diameter portion 258 of transfer gear 256 rotatably engages pinion gear 260, which is fixedly splined to second counter shaft 212. Thus, rotary motion of first countershaft 210 is transferred to second countershaft 212 through first reduction gearing set 216.

Rotary motion of second countershaft 212 is transferred to differential 214 through second reduction gearing set 218. In the embodiment shown in the drawings, second reduction gearing set 218 is in the form of a pinion gear which meshingly engages differential 214. Differential 214 includes ring gear 264, transverse shaft 266, and bevel gears 268, 270, 272, and 274. Differential 214 transfers rotary mechanical motion from pinion gear 218 to output shaft 206, which includes right axle shaft 276 and left axle shaft 278.

Figure 16:
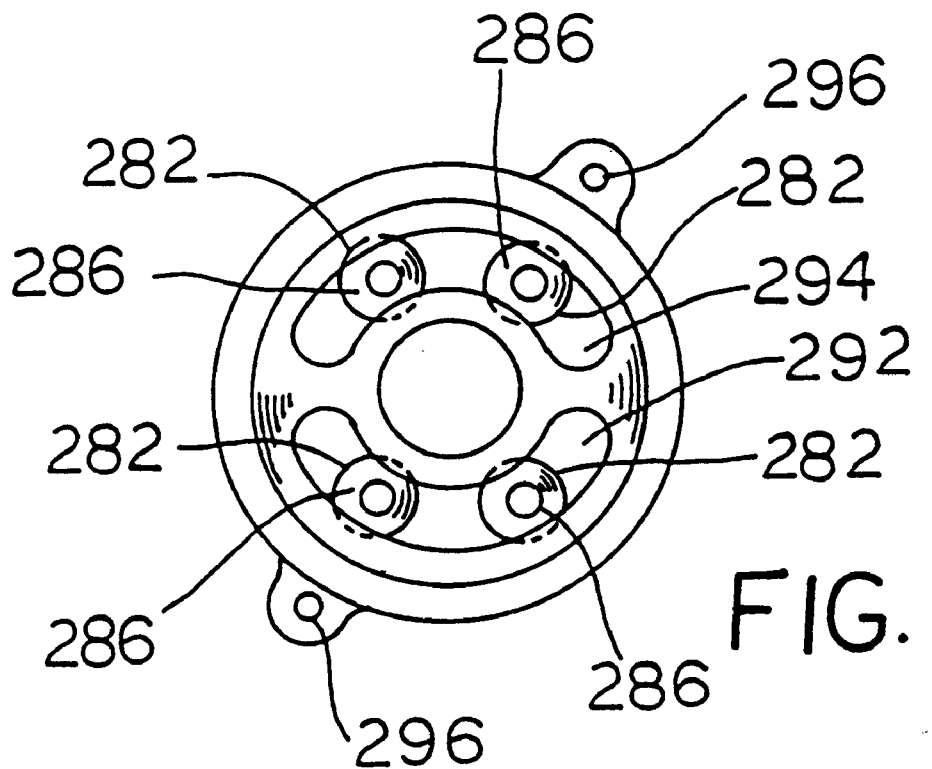
FIG. 16 is a plan view showing the valve plate disposed between the radial piston pump assembly and shock absorber of the transaxle embodiment of FIG. 1.
Figure 17:
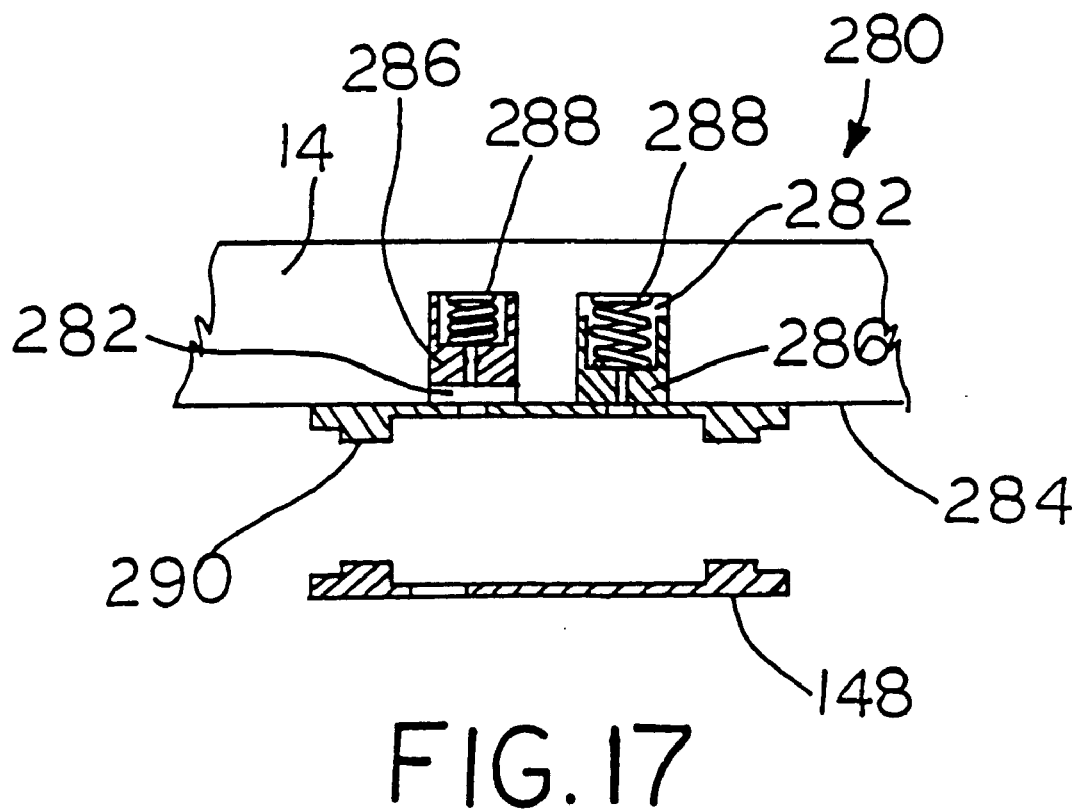
FIG. 17 is a side sectional view of the shock absorber incorporated into the transaxle embodiment of FIG. 1.

Preferred embodiments of the present invention are provided with a hydrostatic shock absorber which is adapted to absorb fluid pressure pulses generated by the radial piston pump 48 as rotary cylinder block 50 of radial piston pump 48 rotates. Referring to FIGS. 2, 16, and 17, a preferred embodiment of the shock absorber, generally designated as 280, is disposed in input shaft housing portion 14 and includes cylinder bores 282. Cylinder bores 282 each have an opening on face 284 of input shaft housing portion 14 such that cylinder bores 282 are in fluid communication with second ports 48 disposed between cylinder bores 53 and second axial face 60 of rotary cylinder block 50. Each cylinder bore 282 is provided with a piston 286 which is capable of reciprocating movement in a corresponding cylinder bore 282 in an outward direction toward the opening of cylinder bore 282 and in an inward direction away from the opening of cylinder bore 282. Each of pistons 286 is biased toward the opening of the cylinder bores 282 by a spring 288. To facilitate fluid communication between cylinder bores 282 and second ports 58, second valve plate 290 is disposed between second axial face 60 of rotary cylinder block 50 and shock absorber 280. Second valve plate 290 includes a pair of arcuate shaped ports 292 and 294. Ports 292 and 294 are in successive fluid communication with second ports 58 of rotary cylinder block 50 during rotation of rotary cylinder block 50. As seen best in FIG. 16, each port 292 and 294 is also in constant fluid communication with respective pairs of cylinder bores 282. Thus, an increase in pressure transmitted to the ports 292 and 294 of second valve plate 290 may be absorbed by one or more of pistons 286 as such pressure increase causes one or more of pistons 286 to move inward into its corresponding cylinder bore 282 in response to the pressure increase. In effect, each piston 286 provides a hydraulically displaceable surface disposed in fluid communication with second ports 58 for absorbing pressure pulses generated by the rotating cylinder block 50.

Figure 18:
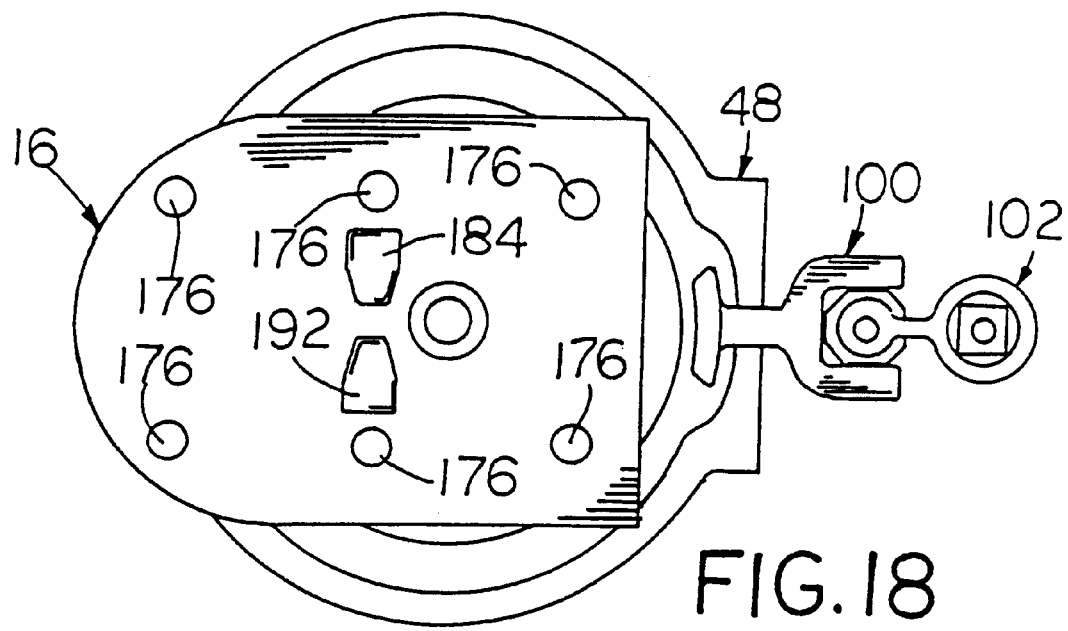
FIG. 18 is an alternative embodiment of the present invention in which a gear motor is fluidly coupled to a radial piston pump assembly such that the axis of rotation of the radial piston pump assembly and the gear motor are substantially parallel.
Figure 19:
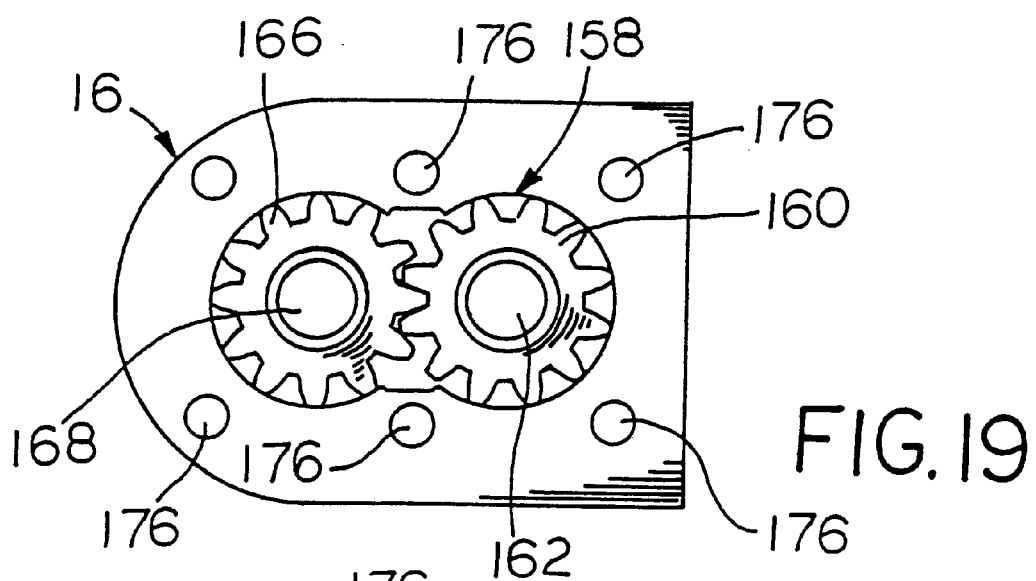
FIG. 19 is a side sectional view showing spur gears of the gear motor of FIG. 18.
Figure 20:
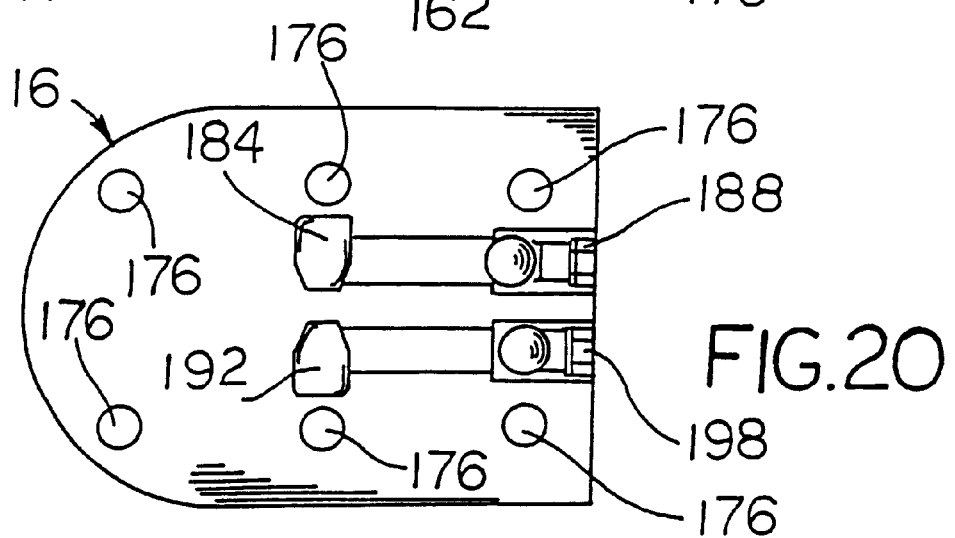
FIG. 20 is a side sectional view of the gear motor of FIG. 19 showing check valves which are used to provide makeup oil to the system.

An alternative embodiment of the present invention is shown in FIGS. 18–20. This embodiment is substantially identical to the embodiment of FIGS. 1–17 except that in the embodiment of FIGS. 18–20, motor 158 is aligned such that the axis of rotation of intermeshing spur gears 160 and 166 is substantially parallel to the axis of rotation of the radial piston pump assembly 48. To accommodate such a difference, discharge fluid passageway 184 and suction fluid passageway 192 extend substantially linearly away from radial piston pump assembly to corresponding discharge and intake regions disposed above and below gears 160 and 166. Other than this difference, the transaxle embodiment of FIGS. 18–20 is substantially the same as transaxle embodiment 10 of FIGS. 1–17. Corresponding parts of the transaxle embodiment of FIGS. 18–20 have therefore been identified by an identical numbering scheme.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transmission, comprising:
   a reciprocating piston pump including a rotatable cylinder having a plurality of pistons therein, said cylinder rotatable about an axis of rotation;
   a gear motor having first and second rotatable spur gears in intermeshing engagement, wherein at least one of said gears is rotatable about an axis of rotation that is oriented 90° relative to the pump axis of rotation;
   a fluid pathway extending between said motor and pump such that said motor is fluidly coupled to said pump, said fluid pathway extending between said gears such that said gears are rotated by the fluid; and
   a motor output shaft fixedly coupled to one of said gears such that the motor output shaft has an axis of rotation that coincides with the axis of rotation of said one gear, whereby rotation of said one gear causes said motor output shaft to rotate.

2. The transmission of claim 1 wherein said pump is a radial piston pump.

3. The transmission of claim 1 wherein said gears of said gear motor rotate about axes that are parallel to each other.

4. The variable speed transaxle of claim 1, wherein the rotatable output shaft is operationally coupled to the differential by a gear system comprising a first countershaft drivingly coupled to the gear motor output shaft.

5. The variable speed transaxle of claim 4, wherein the gear system drivingly coupling the motor output shaft to the differential further comprises a second countershaft which is substantially parallel to the first countershaft and the output shaft, wherein the second countershaft is operationally coupled to the first countershaft by a first reduction gear assembly, and wherein the second countershaft is operationally coupled to the differential by a second reduction gear assembly.

6. The variable speed transaxle of claim 5, wherein the first countershaft has an axis of rotation which substantially coincides with the axis of rotation of said motor output shaft.

7. A variable speed transaxle, comprising:
 a rotatable input shaft for receiving rotary power from an engine;
 a hydrostatic transmission comprising:
  a reciprocating piston pump including a rotatable cylinder having a plurality of pistons therein, said cylinder rotatable about an axis of rotation;
  a gear motor having first and second rotatable spur gears in intermeshing engagement, wherein said gears are rotatable about parallel axes of rotation that are oriented 90° relative to the pump axis of rotation;
  a fluid pathway extending between said motor and pump such that said motor is fluidly coupled to said pump, said fluid pathway extending between said gears such that said gears are rotated by the fluid;
  a motor output shaft fixed to one of said gears such that the motor output shaft has an axis of rotation that coincides with the axis of rotation of said one gear, whereby rotation of said one gear causes said motor output shaft to rotate; and
 a differential mechanically coupled to said motor output shaft.

8. The transaxle of claim 7 wherein said pump is a radial piston pump.

9. A hydrostatically dampened transmission assembly, comprising:
 (a) a radial piston pump including a rotary cylinder block comprising a plurality of radially disposed cylinder bores, wherein the rotary cylinder block is capable of rotation about an axis, wherein the rotary cylinder block is provided with first and second axial faces, wherein a plurality of said cylinder bores includes first and second fluid ports, and wherein each of the first fluid ports of said plurality of cylinder bores is in fluid communication with the first axial face of the rotary cylinder block and each of the second fluid ports of said plurality of cylinder bores is in fluid communication with the second axial face of the rotary cylinder block;
 (b) a first valve plate disposed against the first axial face of the rotary cylinder block, wherein said valve plate comprises intake and discharge ports, said first fluid ports of said plurality of cylinder bores successively communicating with the suction and discharge ports during rotation of the rotary cylinder block;
 (c) a second valve plate disposed against the second axial face of the rotary cylinder block, wherein said valve plate comprises at least one port, said second fluid ports of said plurality of cylinder bores successively communicating with said at least one port during rotation of the rotary cylinder block;
 (d) a motor for converting fluid motion into rotary mechanical motion, said motor operationally engaging an output shaft;
 (e) a hydrostatic fluid pathway extending between the radial piston pump and the motor for fluidly coupling the radial piston pump to the motor; and
 (f) a hydrostatic shock absorber in fluid communication with said at least one port of the second valve plate, said shock absorber adapted to absorb fluid pressure pulses transmitted through the second fluid ports of the cylinder bores and the port of the second valve plate by the radial piston pump as the rotary cylinder block of the radial piston pump rotates.

10. The hydrostatically dampened transmission assembly of claim 9, wherein the motor is a gear pump.

11. The hydrostatically dampened transmission assembly of claim 9, wherein the motor comprises a shaft having an axis of rotation which is substantially perpendicular to the axis of rotation of the rotary cylinder block.

12. The hydrostatically dampened transmission assembly of claim 9, wherein the hydrostatic shock absorber comprises:
 (a) a housing comprising at least one cylinder bore having an opening disposed in fluid communication with said at least one port of the second valve plate; and
 (b) a piston disposed in said at least one cylinder bore, wherein the piston is capable of reciprocating movement in said cylinder bore in an outward direction toward said opening and in an inward direction away from said opening, wherein the piston is biased toward said opening, and wherein an increase in pressure transmitted through said at least one port of the second valve plate is absorbed by the piston as the pressure increase causes the piston to move inward into the cylinder bore in response to said pressure increase.

13. The hydrostatically dampened transmission assembly of claim 12, wherein the second valve plate comprises a pair of arcuate shaped ports and each arcuate shaped port is in fluid communication with at least one cylinder bore of the hydrostatic shock absorber.

14. The hydrostatically dampened transmission assembly of claim 12, wherein the second valve plate comprises a pair of arcuate shaped ports and each arcuate shaped port is in fluid communication with at least two cylinder bores of the hydrostatic shock absorber.

15. A hydrostatically dampened assembly, comprising:
 (a) a radial piston pump comprising a rotary cylinder block provided with first and second axial faces, wherein the rotary cylinder block comprises a plurality of radially disposed cylinder bores including first and second fluid ports, wherein the first ports of the cylinder bores are in fluid communication with the first axial face of the rotary cylinder block and the second ports of the cylinder bores are in fluid communication with the second axial face of the rotary cylinder block; and
 (b) a hydrostatic shock absorber comprising at least one hydraulically displaceable surface disposed in fluid communication with said second fluid ports wherein said hydraulically displaceable surface is biased in a direction opposing said hydraulic displacement.

16. The hydrostatically dampened transmission assembly of claim 15, wherein the hydrostatic shock absorber comprises:

(a) a housing comprising at least one cylinder bore having an opening disposed in fluid communication with said second ports; and (b) a piston disposed in said at least one cylinder bore, wherein the piston is capable of reciprocating movement in said cylinder bore in an outward direction toward said opening and in an inward direction away from said opening, wherein the piston is biased toward said opening, and wherein an increase in pressure transmitted through at least one of said second ports is absorbed by the piston as the pressure increase causes the piston to move inward into the cylinder bore in response to said pressure increase.

\* \* \* \* \*